E. H. BRISTOL.
NOZZLE FOR PRESSURE SENSITIVE DEVICES.
APPLICATION FILED FEB. 27, 1918.
1,311,798. Patented July 29, 1919.
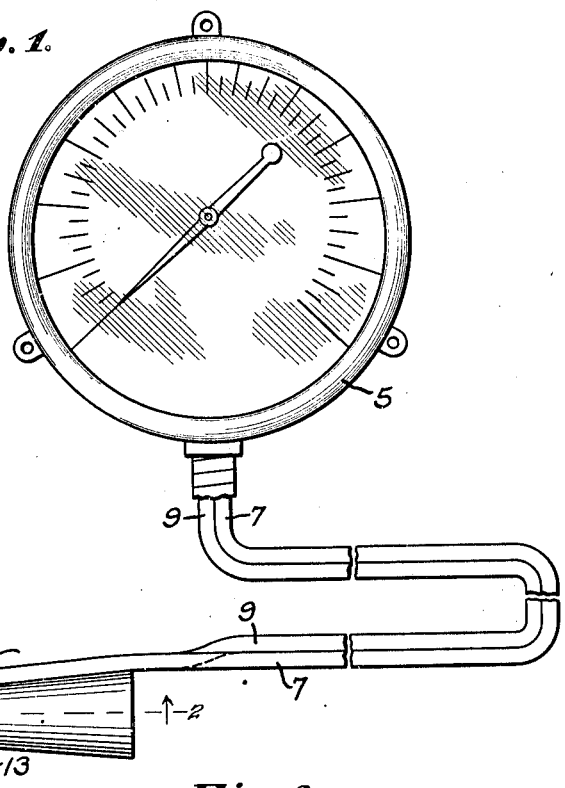
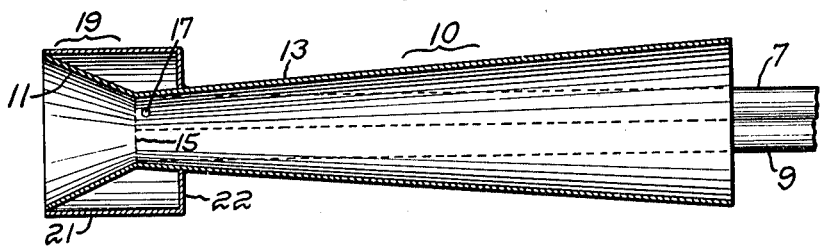
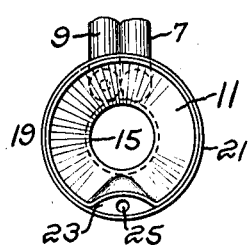
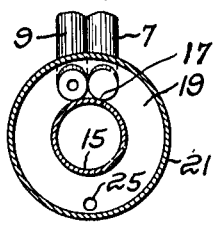
Inventor:
Edgar H. Bristol,
by Emery Booth Janney & Varney
Attys.

UNITED STATES PATENT OFFICE.

EDGAR H. BRISTOL, OF FOXBORO, MASSACHUSETTS, ASSIGNOR TO FOXBORO COMPANY, OF FOXBORO, MASSACHUSETTS, A CORPORATION OF MASSACHUSETTS.

NOZZLE FOR PRESSURE-SENSITIVE DEVICES.

1,311,798.      Specification of Letters Patent.      Patented July 29, 1919.

Application filed February 27, 1918. Serial No. 219,365.

*To all whom it may concern:*

Be it known that I, EDGAR H. BRISTOL, a citizen of the United States, and resident of Foxboro, in the county of Norfolk, State of Massachusetts, have invented an Improvement in Nozzles for Pressure-Sensitive Devices, of which the following description, in connection with the accompanying drawings, is a specification, like characters on the drawings representing like parts.

This invention relates to a nozzle for use in connection with suitable pressure sensitive mechanism for measuring the flow of fluids, particularly of gases. For example, the speed of an airplane relative to the air may be measured by means of a suitable pressure gage, provided the pressure due to the passage of the air is introduced to such a gage by means of a suitable mechanism of which the present invention is an example.

My invention will best be understood by reference to the following description of the illustrative embodiment thereof shown in the accompanying drawings wherein:—

Figure 1 is a schematic view of an airplane speedometer embodying as a part thereof a nozzle constructed in accordance with my invention;

Fig. 2 is a section on the line 2—2 of Fig. 1;

Fig. 3 is a front end elevation; and

Fig. 4 is a section on the line 4—4 of Fig. 1.

Referring to Fig. 1 of the drawings, I have there shown an airplane speedometer embodying a suitable differential pressure gage 5 which may be and preferably is of the type shown in my Patent No. 1,240,790, dated Sept. 18th, 1917. Pressure is admitted to the gage through the sub-atmospheric or vacuum pipe 7 and the pressure pipe 9. These pressures are due to the action of the nozzle 10 with which the pipes 7 and 9 communicate, the particular form of which shown in the accompanying drawings I will now more particularly describe.

Referring to Fig. 2, the nozzle comprises an open-ended tube, preferably formed of two frusta 11 and 13 placed with their smaller bases together, thus providing a constricted portion 15 from which the tube flares toward either end. The tube constructed in this manner forms what is well known as a Venturi tube. Preferably, as herein shown, the larger bases of the two frusta, which may be of different altitudes as shown, are equal and in axial alinement. The vacuum pipe 7 opens to the constricted portion 15 of the tube through an opening or port 17 (see Figs. 2 and 4). If the nozzle is attached to a moving vehicle, such as an airplane, air passing through the open tube will create a suction in the pipe 7 as it sweeps by the port or opening 17. In particular, considering the illustrative embodiment, because of the well known properties of the Venturi tube the pressure of the passing current of air is less at the constricted portion 15 and therefore a greater draft or suction is created in the pipe 7.

The pressure pipe 9 opens to a housing 19 inclosing the forward end of the tube 10. Herein this housing has a cylindrical wall 21 rising from the base of the frustum and a rear wall 22. The cylindrical wall 21 lies in the cylindrical surface whose bases are the two greater bases of the frusta 11 and 13. In the present embodiment of the invention an admission opening is provided to the housing 19 by mutilation of the frustum 11, and herein (see Fig. 3) a portion of the latter, preferably on the bottom on the other side of the axis of the housing across from the opening 17, is bent so as to extend across the end of the cylindrical surface providing an admission opening 23. Preferably the surface of 11 is reversely curved as shown, so that the opening 23 is lenticular, as thereby no shortening of the material is necessary. The air rushing in to the housing through this opening will create a pressure therein which is led to the gage 5 through pipe 9, which as seen in Fig. 4, opens to the housing, preferably, as will be seen by contrasting the Figs. 3 and 4, at a point remote from the admission opening and conveniently on the side opposite the same. Herein I show the pipe 9 as extended inwardly beyond the rear wall 22 of the housing. (See Figs. 2 and 4.) Thus if water enters the housing and the airplane tilts so that the water flows toward the end of pipe 9, it will gather around the walls of the same and not flow into the end, and when the plane tilts in the other direction will drain from the housing.

The wall of the housing 19 may be provided with a drainage hole 25, the size of which will not be great enough to prevent the air entering the housing 19 from creating a pressure in said housing but which will permit moisture to be expelled from the housing. Conveniently as here shown, the hole 25 is in line with the admission opening 23.

It is desirable that moisture should not be permitted to enter in instruments of this kind, as it not only harms the mechanism but affects the accuracy. In the present instance it will be noted that moisture is not likely to enter through pipe 7 as the tendency is to draw out from the same. Regarding the housing 19, the pipe 9 is on the other side of the housing from the admission opening 23 and water cannot be directly blown into the pipe. If the airplane tilts, any moisture which may have collected near the bottom of the housing where the opening 23 is located may run out under gravity.

The design of the nozzle chosen for purposes of illustration and herein described is desirable as the form facilitates its passage through the air, avoids the formation of disturbing currents and makes the action constant and accurate.

Having thus described in detail the particular form of my invention chosen for purposes of illustration, what I claim as new and desire to secure by Letters Patent is:—

1. A nozzle for fluid pressure sensitive devices comprising a Venturi tube, a duct opening to the constricted portion thereof, a housing inclosing the forward end of the tube and spaced from the margin thereof to provide an admission opening presented toward the front of the tube and a duct opening to said housing.

2. A nozzle for fluid pressure sensitive devices comprising a Venturi tube, a duct opening to the constricted portion thereof, a housing inclosing the forward end of the tube and joined marginally thereto about the great portion of its perimeter, the wall of the Venturi being locally distorted to extend across the front of said housing to provide an admission opening thereto and a duct opening to said housing.

3. A nozzle as defined in claim 1 wherein the ducts open on the other side of the axis from the admission opening.

4. A nozzle as defined in claim 2 wherein the ducts open on the other side of the axis from the admission opening.

5. A nozzle for fluid pressure sensitive devices comprising an open-ended tube, a duct opening laterally thereto, a housing about said tube having an intake opening exterior to the tube and presented toward the front thereof and a duct opening to said housing.

6. A nozzle as defined in claim 5 wherein the ducts open to the other side of the axis from the intake opening.

7. A nozzle as defined in claim 5 wherein the housing is provided with a minute drainage hole.

8. A nozzle for fluid pressure sensitive devices comprising a tube formed by opposed frusta having substantially equal and alined greater bases, a duct opening thereto adjacent the joined smaller bases thereof, a housing having a cylindrical wall rising from the base of the leading frustum, said last mentioned frustum being mutilated, to provide an admission opening to the housing and a duct opening to said housing at a point remote from said opening.

9. A nozzle having a flaring mouth open at both ends and having a duct opening laterally thereto at the narrow portion thereof, a housing surrounding the same and spaced from the margin thereof to provide an admission opening and a duct opening to the housing.

10. A nozzle for fluid pressure sensitive devices comprising an open-ended tube, a duct opening laterally thereto, a housing inclosing the end of said tube having an intake opening presented toward the front thereof and a pipe entering and projecting within said housing at a point remote from said opening.

11. A nozzle for fluid pressure sensitive devices comprising a Venturi tube, a duct opening to the constricted portion thereof, a housing inclosing the forward end of the tube and joined marginally thereto about the greater portion of its perimeter, the wall of the housing and of the tube being locally spaced to provide an admission opening to said housing and a pipe entering and projecting within said housing at a point remote from said opening.

12. A nozzle for fluid pressure sensitive devices comprising a Venturi tube, a duct opening to the constricted portion thereof, a housing inclosing the forward end of the tube and joined marginally thereto about the greater portion of its perimeter, the wall of the Venturi being reversely bent locally to extend across the front of the housing to provide a lenticular admission opening thereto and a duct opening to the housing.

In testimony whereof, I have signed my name to this specification.

EDGAR H. BRISTOL.